(12) United States Patent
Drescher et al.

(10) Patent No.: US 7,036,236 B1
(45) Date of Patent: May 2, 2006

(54) METHOD FOR CERTIFYING AND CALIBRATING MULTI-AXIS POSITIONING COORDINATE MEASURING MACHINES

(75) Inventors: Joseph D. Drescher, Middletown, CT (US); Jesse R. Boyer, Berlin, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/101,250

(22) Filed: Apr. 7, 2005

(51) Int. Cl.
    *G01C 25/00* (2006.01)
(52) U.S. Cl. .......................................... 33/502; 73/1.79
(58) Field of Classification Search .......... 33/502–503, 33/567, 567.1; 73/1.01, 1.79
See application file for complete search history.

(56) References Cited

U.S. PATENT DOCUMENTS

| | | | |
|---|---|---|---|
| 3,908,278 A * | 9/1975 | Sundahl ........................ | 33/502 |
| 4,962,591 A * | 10/1990 | Zeller et al. .................. | 33/502 |
| 5,125,261 A * | 6/1992 | Powley ........................ | 33/502 |
| 5,142,211 A | 8/1992 | Tan | |
| 5,216,590 A | 6/1993 | Ota | |
| 5,239,160 A | 8/1993 | Sakura et al. | |
| 5,313,410 A * | 5/1994 | Watts ........................... | 33/503 |
| 5,727,296 A | 3/1998 | Kobler | |
| 6,355,331 B1 | 3/2002 | Hillier | |
| 6,513,253 B1 * | 2/2003 | Matsuda et al. .............. | 33/502 |
| 6,719,506 B1 | 4/2004 | Chang et al. | |
| 2003/0106229 A1 * | 6/2003 | Jordil et al. .................. | 33/502 |

* cited by examiner

*Primary Examiner*—Yaritza Guadalupe
(74) *Attorney, Agent, or Firm*—Bachman & LaPointe, P.C.

(57) ABSTRACT

A method for certifying and calibrating a multi-axis coordinate measuring machine includes the steps of loading a check standard into a means for holding of the multi-axis coordinate measuring machine; measuring a virtual location of each of a plurality of apertures of the check standard within a virtual coordinate system using a touch probe of the multi-axis coordinate measuring machine; measuring an actual location of each of the apertures and simultaneously verifying the accuracy of the virtual coordinate system of the check standard using an optical probe of the multi-axis coordinate measuring machine; and calculating a deviation between the actual location of each of the apertures and a virtual location of each of the apertures of the virtual coordinate system.

22 Claims, 4 Drawing Sheets

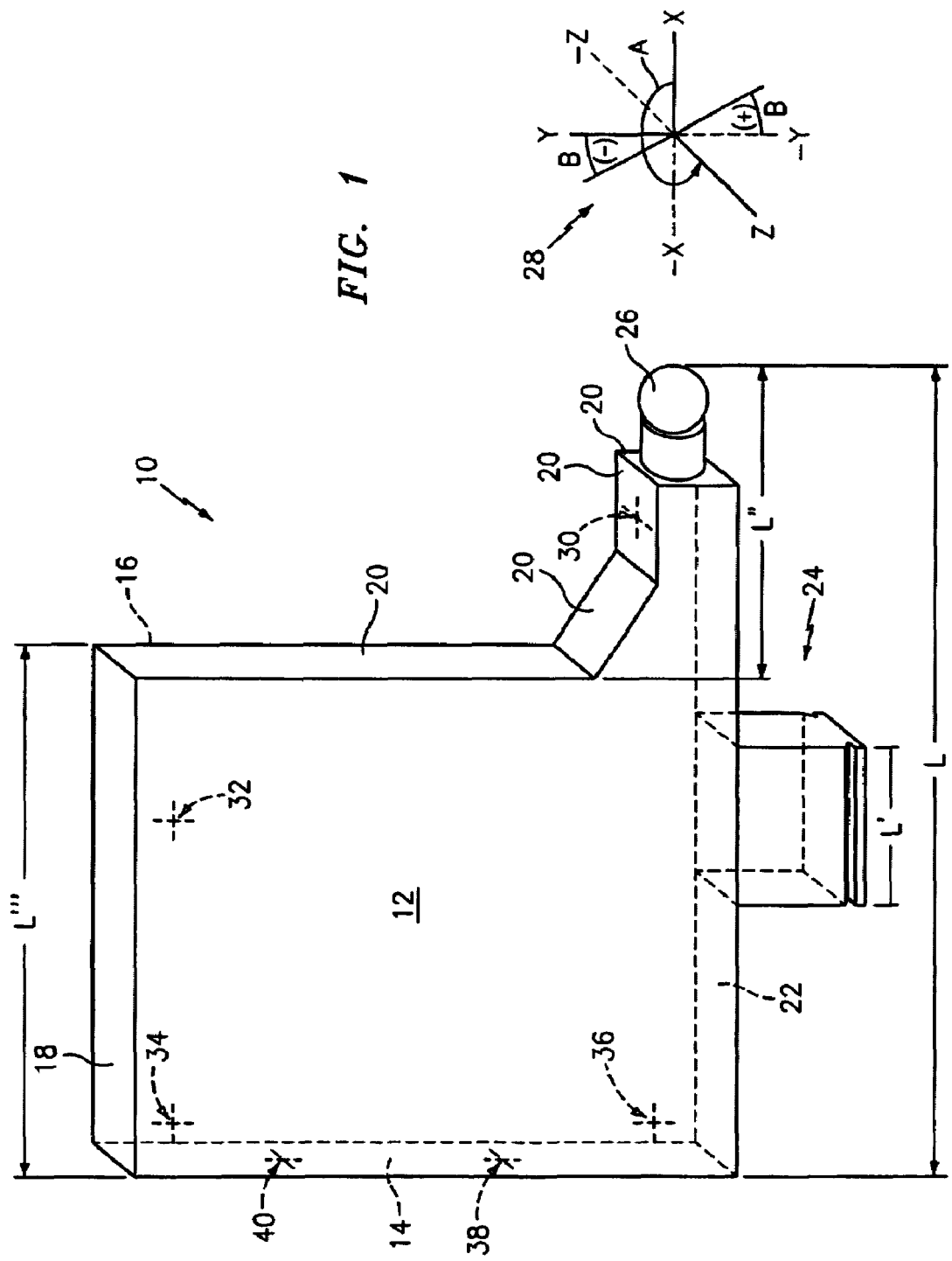

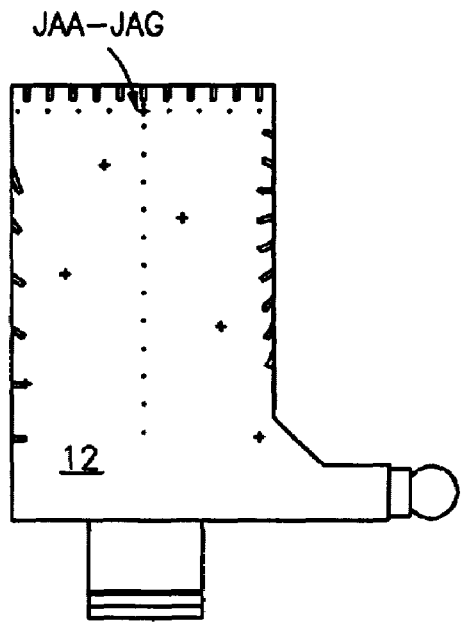
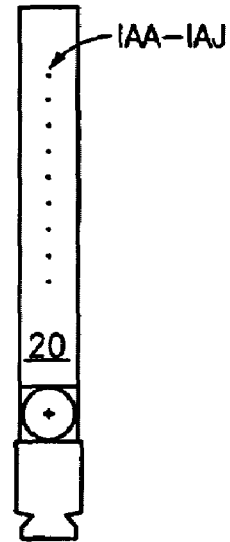
FIG. 2A    FIG. 2B
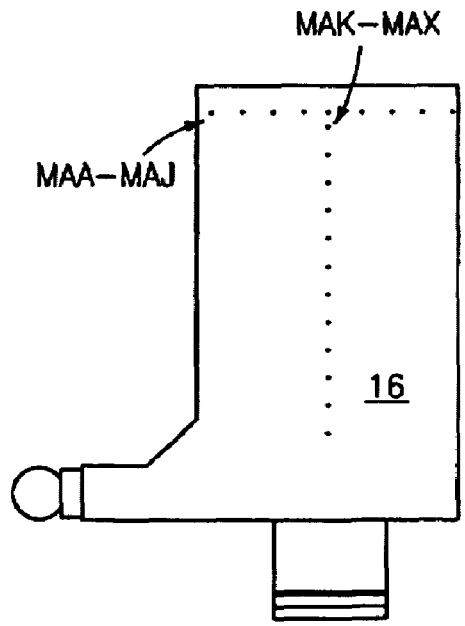
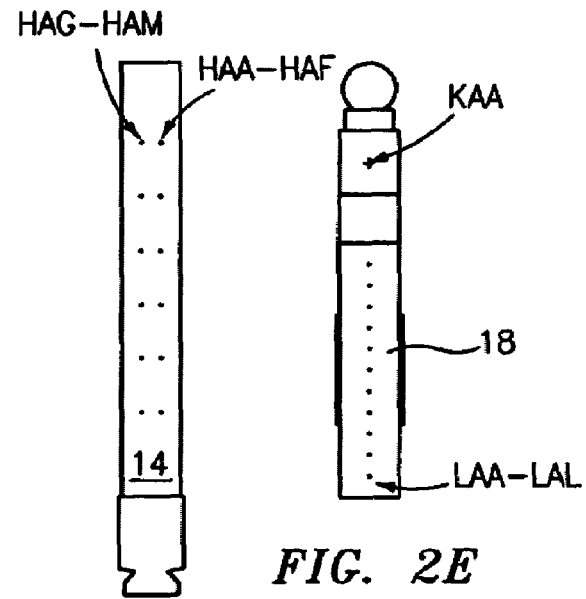
FIG. 2C    FIG. 2D    FIG. 2E

METHOD FOR CERTIFYING AND CALIBRATING MULTI-AXIS POSITIONING COORDINATE MEASURING MACHINES

FIELD OF USE

The present invention relates to certifying and calibrating machines, and more particularly, relates to a certifying and calibrating multi-axis positioning coordinate measuring machines.

BACKGROUND OF THE INVENTION

Presently, there exists no known Standard artifact either in the United States or internationally for certifying or calibrating a multi-axis positioning Coordinate Measuring Machine (CMM) for the application of verifying dimensional accuracy of cooling holes on turbine airfoils.

Current methods rely upon separate three-axis calibration and separate rotational axis calibration. Given the complexity of the configuration of the cooling holes for a turbine airfoil a gold standard is typically employed. The gold standard is an artifact that represents a single version of a part, for example, a turbine airfoil. A turbine airfoil is an appropriate part as the cooling holes pattern of airfoil is typically measured using five-axis positioning Coordinate Measuring Machines. An aft-loaded turbine airfoil, for example, will have certain structural features and a specific pattern of cooling holes for its intended application. In order to be an effective Standard artifact, the gold standard for this particular aft-loaded turbine airfoil must essentially embody the same structural features and specific cooling holes pattern. As a result, the time and craftsmanship required to manufacture a gold standard for each manufactured part measured by a multi-axis positioning Coordinate Measuring Machine is cost prohibitive.

It is also recognized that simply utilizing the actual part, for example, the turbine airfoil, to certify and calibrate the Coordinate Measuring Machine, which inspects the actual part, does not meet basic metrology requirements. Typically, the artifact's accuracy compared to the machine must be within a ratio of 10:1 or $1/10^{th}$ the accuracy of the machine. For example, if the machine is intended to measure a real part to an accuracy of $1/10,000^{ths}$ then the machine must be accurate to a $10^{th}$ of that measurement. Consequently, artifact must be accurate to less than $1/10^{th}$ of the accuracy of the machine in order to provide a ratio better than 10:1. Again, the workmanship and effort involved to manufacture a Gold Standard having an accuracy to less than $1/10^{th}$ of the accuracy of the machine for each actual part manufactured and measured by the multi-axis Coordinate Measuring Machine is too expensive.

Consequently, there exists a need for a traceable Standard to assess multi-axis Coordinate Measuring Machines and, more specifically, the multi-axis, volumetric capability of the cooling holes patterns of turbine airfoils.

SUMMARY OF THE INVENTION

In accordance with the present invention, a check standard for use in calibrating a multi-axis coordinate measuring machine broadly comprises a body comprising a plurality of surfaces; one or more surfaces comprise a plurality of apertures configured to induce exercising a linear motion of an X axis and a Y axis during the calibration of the multi-axis coordinate measuring machine, requiring a dual axis motion during the calibration of the multi-axis coordinate measuring machine, testing a diameter measuring capability during the calibration of the multi-axis coordinate measuring machine, exercising the complete range of a tilt axis during the calibration of the multi-axis coordinate measuring machine, detecting a cyclic error of the tilt axis during the calibration of the multi-axis coordinate measuring machine, requiring simultaneous operation of the tilt axis and a rotary axis during the calibration of the multi-axis coordinate measuring machine, and diagnosing and detection of a non-orthogonality of a linear axis during the calibration of the multi-axis coordinate measuring machine; one or more surfaces comprise an origin of a coordinate system for the plurality of apertures; and one or more surfaces comprise a fixture capable of being received by the multi-axis coordinate measuring machine.

In accordance with the present invention, a check standard for use in calibrating a multi-axis coordinate measuring machine broadly comprises a substantially prismatic shaped body comprising six surfaces; one or more surfaces comprise a plurality of apertures configured to induce exercising a linear motion of an X axis and a Y axis during the calibration of the multi-axis coordinate measuring machine, requiring a dual axis motion during the calibration of the multi-axis coordinate measuring machine, testing a diameter measuring capability during the calibration of the multi-axis coordinate measuring machine, exercising the complete range of a tilt axis during the calibration of the multi-axis coordinate measuring machine, detecting a cyclic error of the tilt axis during the calibration of the multi-axis coordinate measuring machine, requiring simultaneous operation of the tilt axis and a rotary axis during the calibration of the multi-axis coordinate measuring machine, and diagnosing and detection of a non-orthogonality of a linear axis during the calibration of the multi-axis coordinate measuring machine; one or more surfaces comprise an origin of a coordinate system for the plurality of apertures; and one or more surfaces comprise a fixture capable of being received by the multi-axis coordinate measuring machine.

In accordance with the present invention, a check standard for use in calibrating a multi-axis coordinate measuring machine broadly comprises a prismatic shaped body comprising six surfaces and embodying one or more structural feature of a root section and one or more structural feature of an airfoil of a turbine blade or stator; one or more surfaces comprise a plurality of apertures configured to induce exercising a linear motion of an X axis and a Y axis during the calibration of the multi-axis coordinate measuring machine, requiring a dual axis motion during the calibration of the multi-axis coordinate measuring machine, testing a diameter measuring capability during the calibration of the multi-axis coordinate measuring machine, exercising the complete range of a tilt axis during the calibration of the multi-axis coordinate measuring machine, detecting a cyclic error of the tilt axis during the calibration of the multi-axis coordinate measuring machine, requiring simultaneous operation of the tilt axis and a rotary axis during the calibration of the multi-axis coordinate measuring machine, and diagnosing and detection of a non-orthogonality of a linear axis during the calibration of the multi-axis coordinate measuring machine; one or more surfaces comprise an origin of a coordinate system for the plurality of apertures; and one or more surfaces comprise a fixture capable of being received by the multi-axis coordinate measuring machine.

In accordance with the present invention, a method for certifying and calibrating a multi-axis coordinate measuring machine broadly comprises loading a check standard into a means for holding of the multi-axis coordinate measuring machine; measuring a virtual location of each of a plurality of apertures of said check standard within a virtual coordinate system using a touch probe of said multi-axis coordinate measuring machine; measuring an actual location of each of the plurality of apertures and simultaneously verifying the accuracy of the virtual coordinate system of the check standard using an optical probe of the multi-axis coordinate measuring machine; and calculating a deviation between the actual location of each of the plurality of apertures and a virtual location of each of the plurality of apertures of the virtual coordinate system.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 is a representation of the Check Standard of the present invention;

FIG. 2A is a side view of a left-hand side of the Check Standard of FIG. 1 depicting reference holes JAA–JAG vertically aligned on the surface of the Check Standard;

FIG. 2B is a frontal view of the Check Standard of FIG. 1 depicting reference holes IAA–IAJ vertically aligned on the surface of the Check Standard;

FIG. 2C is a side view of a right-hand side of the Check Standard of FIG. 1 depicting reference holes MAA–MAJ horizontally aligned and reference holes MAK–MAX vertically aligned on the surface of the Check Standard;

FIG. 2D is a rear view of the Check Standard of FIG. 1 depicting reference holes HAA–HAF vertically aligned in the right-hand column and reference holes HAG–HAM vertically aligned in the left-hand column on the surface of the Check Standard;

FIG. 2E is a top view of the Check Standard of FIG. 1 depicting reference holes LAA–LAL on the surface of the Check Standard;

Like reference numbers and designations in the various drawings indicate like elements.

DETAILED DESCRIPTION

Figure 3:
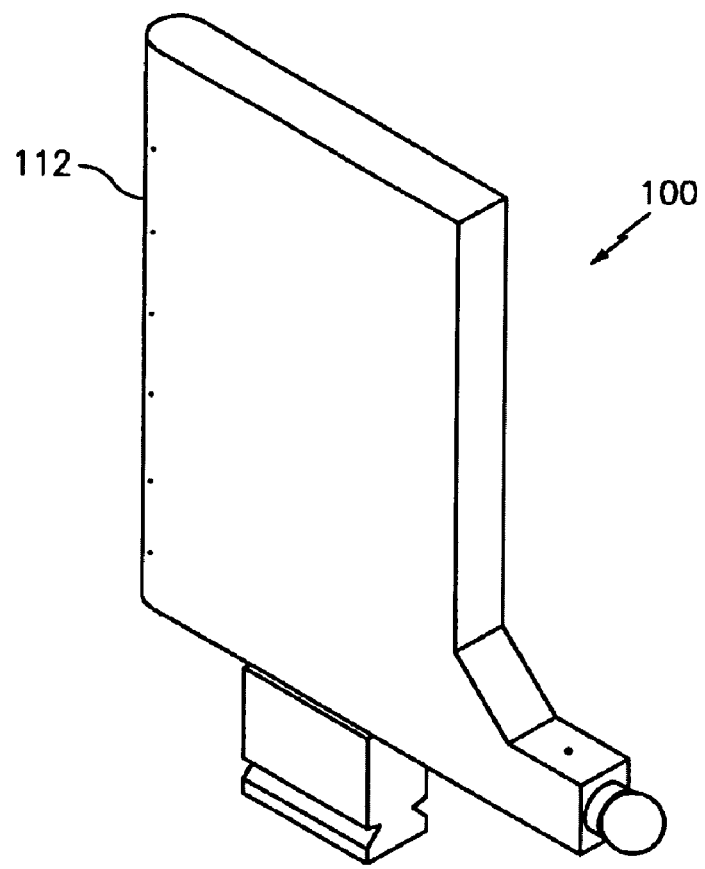
FIG. 3 is a representation of an alternative embodiment of the Check Standard of the present invention.

To achieve repeatable certification and calibration of multi-axis CCMs a Check Standard representative of all blades and stators (vanes) inspected in terms of size and cooling hole configuration is described herein to enable one or more such method. For purposes of ease and understanding, the terms "certifying" or "certification" and "calibrating" or "calibration" are used interchangeably and are generally understood to mean the act of standardizing a measuring instrument by determining the deviation from a standard so as to ascertain proper correction factors and the standardization of a measuring instrument.

The Check Standard described herein closely resembles a turbine airfoil's structural design and cooling holes patterns in order to meet the requirements of American National Standards Institute ANSI Z450-1-1194, International Organization for Standards ISO 10012:2003, as well as the National Aerospace Standards (NAS), Society of Automotive Engineers (SAE), American Society of Mechanical Engineers (ASME) and the related standard implementing societies. For example, ISO 10012:2003 specifies generic requirements and provides guidance for the management of measurement processes and metrological confirmation of measuring equipment used to support and demonstrate compliance with metrological requirements.

To fulfill the requirements of these widely accepted and adopted domestic and international calibration procedures the Check Standard described herein accomplishes the following:

(1) the angles of the holes of the cooling holes pattern relative to the local surface normals cover the range of angles found on most typical turbine airfoil designs;

(2) its structural design comprises a section representing the root and a section representing the airfoil;

(3) its size is parametrically scalable such that each length dimension may be increased or decreased by the same percentage from nominal to suit the size of blades and vane being inspected;

(4) ratios of length/width, length/thickness, thickness/width are similar to turbine blades and vanes; and (5) the six-point kinematic "nest" is similar to an actual airfoil nest.

With respect to the fifth enumeration, a six-point kinematic nest is a collection of exactly six points on a body surface, suitably chosen such that when these six points of the body are constrained from motion in the directions normal to the surface at those respective points, the body itself is constrained from all rigid-body motion.

The Check Standard described herein may also be verified periodically and traceable, and preferably is verified periodically and traceable. To facilitate the periodic inspection by certified calibration sources such as the National Institute of Standards and Technology (NIST) the Check Standard includes the following features:

(1) its shape is prismatic which allows the defining gauge points of the six-point kinematic nest to be established with minimal measurement uncertainty; and (2) the holes of the cooling holes pattern are approximately fifty percent (50%) larger than actual cooling holes so that the holes may be produced with better form and edge condition in order to isolate measurement uncertainty due to the condition of the holes from the accuracy of the inspection machine sought to be certified.

Throughout the description, the terms "holes" and "apertures" are interchangeable and both terms refer to the holes of the cooling holes configuration of a Check Standard, a turbine blade, a turbine stator or as otherwise described and explained.

Referring now to FIG. 1, a Check Standard 10 contemplated herein may generally be designed and constructed bearing a prismatic structure in mind. The prismatic feature facilitates the establishment of datum surfaces and datum points from which a plurality of cooling hole locations are specified, that is, a cooling hole configuration representative of various actual blade or stator (vane) designs by companies such as United Technologies Corporation, Pratt & Whitney, Rolls Royce Ltd., General Electric Company and others. To achieve such a representative structural design five of the six surfaces, or a first surface 12, a second surface 14, a third surface 16 (not shown), a fourth surface 18 and a fifth surface 20, of Check Standard 10 contain reference holes representing the cooling holes configuration. A sixth surface 22 embodies a "root section" of a turbine airfoil, or an attachment feature 24, used to secure Check Standard 10 to a machine fixture or table, and preferably the fixture or table of a five-axis Coordinate Measuring Machine. Generally, the length of the root section (L') may be about twenty-five percent (25%) to fifty percent (50%) of the length of Check Standard 10 (L). The length of the tooling ball and sloping fifth surface 20 (L") may be about twenty percent (20%) to fifty percent (50%) of the length L. The length of surface 18 (L''') may be about fifty percent (50%) to eighty percent (80%) of the length L. However, it is understood to one of ordinary skill in the art that the dimensions and shape of Check Standard 10 may change depending upon the application, that is, the part in question and type of multi-axis coordinate measuring machine.

One of the five remaining surfaces, for example, the fifth surface 20, includes an origin 26 of a virtual coordinate system 28 from which the hole positions are specified. The origin facilitates the inspection of the hole positions when certain certification methods are utilized. The origin 26 of virtual coordinate system 28 for the Check Standard may be a tooling ball as shown in FIG. 1. Virtual coordinate system 28 is depicted in FIG. 1 and juxtaposed proximate to origin 26. One of ordinary skill in the art will recognize that a multi-axis coordinate measuring machine measures in both directions (positive and negative) along the X-axis, Y-axis and Z-axis. When the multi-axis encompasses more than three axes, such as five axes, the fourth axis may be represented by an angular measurement, for example, angle B, taken along the Y-axis in both positive and negative directions as depicted in FIG. 1, and the fifth axis may be represented by an angular measurement, for example, angle A, taken along the X-axis and measured from 0° to 360° in the X-Z plane as depicted in FIG. 1. Three of the five surfaces include the six points 30, 32, 34, 36, 38, 40 and 42 of the six-point kinematic nest of Check Standard 10. The locations of these six kinematic nest points as illustrated merely represent one possible configuration as other six-point kinematic nest configurations may be employed as understood by one of ordinary skill in the art. One point 30 may be located proximate to origin 26 along the X-axis of virtual coordinate system 28. Three points 30, 32, 34 and 36 may be located in the X-Y plane of virtual coordinate system 28. Two points 38 and 40 may be located along the Y-axis of virtual coordinate system 28.

As mentioned, Check Standard 10 includes sixth surface 22, that is, a section representing the "root" section of an airfoil design. The root section may be designed to be functionally similar to existing blade and stator (vane) designs. Preferably, the root section comprises a simplified geometry compared to the typical fir tree root section structural design of typical blade and stators (vanes). For purposes of use in CMMs, the root section is designed so that the Check Standard may be fixtured or fixturable and held in place on a measurement machine using existing, readily available tooling for actual blades and stators (vanes).

Check Standard 10 also includes a plurality of holes, and more specifically, a cooling holes configuration 30 representative of configurations, that is, spacing, angular configuration, depth, diameter, location, other dimensions, and the like, of actual cooling hole patterns of blades and stators (vanes). The reference holes and their configuration on Check Standard 10 are not limited to the illustrations depicted herein. It is contemplated that the reference holes may be placed in different configurations, patterns, locations, surfaces, and the like, about Check Standard 10 as new turbine blades and stators (vane) designs are developed and commercially utilized by companies such as United Technologies Corporation, Pratt & Whitney, Rolls Royce Ltd., General Electric Company and others.

Referring specifically now to FIGS. 2A–2E, Check Standard 10 and its representative cooling holes configuration may include the following structural features:

(1) holes are positioned such that linear motion of X and Y machine axes are exercised throughout the working range and thus the accuracy of such motion is verified (Reference holes MAA–MAX in FIG. 2C);

(2) holes are positioned such that dual axis motion is required for inspection (Reference holes JAA–JAG in FIG. 2A);

(3) holes with varying diameter are utilized to verify the inspection machine's ability to determine diameter (Reference holes LAA–LAL in FIG. 2E);

(4) holes are located and specified with varying angles to the surface such that the full working range of the tilt axis is exercised in the measurement, and the angular spacing of those holes is specified to detect cyclic error of the tilt axis (Reference holes HAA–HAM in FIG. 2D);

(5) holes are located and specified with varying compound angles to the surface such that both tilt and rotary axes must be operated simultaneously to effect the measurement, and the angular spacing of those holes is specified to detect cyclic error on either of the rotational axes (Reference holes IAA-IAJ in FIG. 2B); and (6) a single hole is provided at an extended radius that may be measured in multiple orientations of the rotary axis to diagnose and detect non-orthogonality of the linear axes (Reference hole KAA in FIG. 2E).

Check Standard 10 may comprise a durable material capable of providing dimensional stability against minor collisions sustained during calibration procedures and manual handling and against internal stress relief that may otherwise occur. Suitable materials embodying these durable features include but are not limited to hardened steel such as MES 70, commercially available as Jess-Air® from Jessop Steel Company of Washington, Pa.; Orbit® from Crucible Materials Corporation of Syracuse, N.Y.; and, Vega® from Carpenter Technology of New Jersey; or MES 72, commercially available as Airkool-S® from Crucible Materials Corporation of Syracuse, N.Y.; Select B FM® from Timkin Company of Canton, Ohio; and Windsor® from Jessop Steel Company of Washington, Pa.

Check Standard 10 contemplated herein may also include a surface treatment (not shown) in order to further replicate the features of a turbine airfoil. The surface treatment lends color, that is, optical properties, similar to a turbine airfoil surfaces to be inspected and also creates more favorable material properties near the surface including but not limited to stability, hardness, corrosion resistance and the like. Suitable surface treatments include but are not limited to any stable, hard materials commonly used with turbine airfoils and suitable for coating the artifact. For example, one such suitable surface treatment is black oxide pursuant to Aerospace Materials Specification 2485.

In the alternative to the one embodiment described, other Check Standard designs are contemplated. For example, referring now to FIG. 3, another Check Standard design 100 is depicted which bears close resemblance to a turbine blade or stator (vane). This Check Standard design also incorporates six surfaces, an origin for the coordinate system and a plurality of cooling holes for a representative cooling holes configuration. A leading edge 102 along a Y axis includes a semi-circular cross-section; however, any of the six surfaces may include a curvature, the cross-section of which may not be circular. Due to the curvature employed in this embodiment a CMM may experience difficulty in accurately establishing the datum surfaces and datum points of Check Standard 100 during a certification or calibration process.

Figure 4:
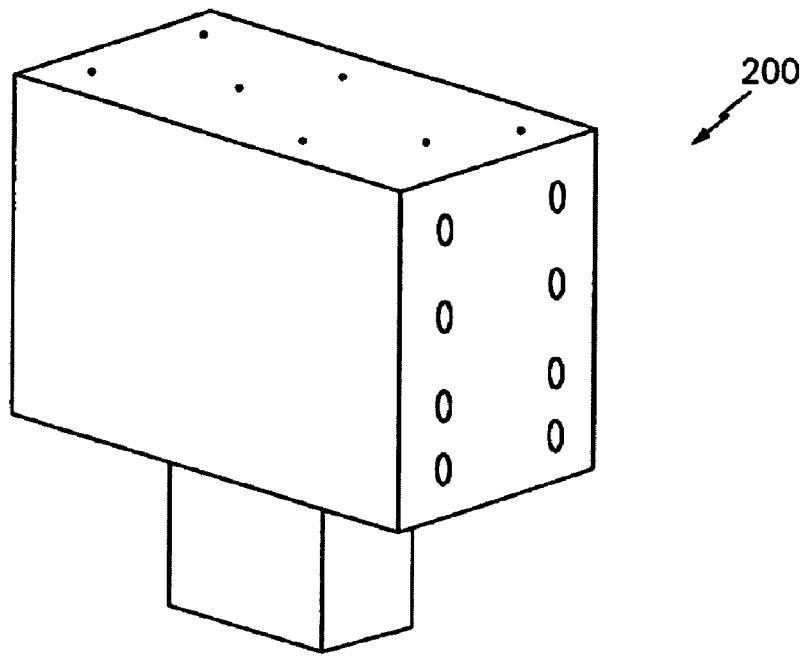
FIG. 4 is a representation of another alternative embodiment of the Check Standard of the present invention.

In another alternative embodiment, a Check Standard design 200 is depicted in FIG. 4 to demonstrate the scalability of the Check Standard design contemplated herein. The Check Standard scale may be adjusted to represent different size airfoils, including up to, for example, a factor of 10 for industrial turbine applications. Likewise, the ratios of length/width, length/thickness, width/thickness and the like, are freely adjustable for the same purpose as contemplated within the scope of this invention.

Figure 5:
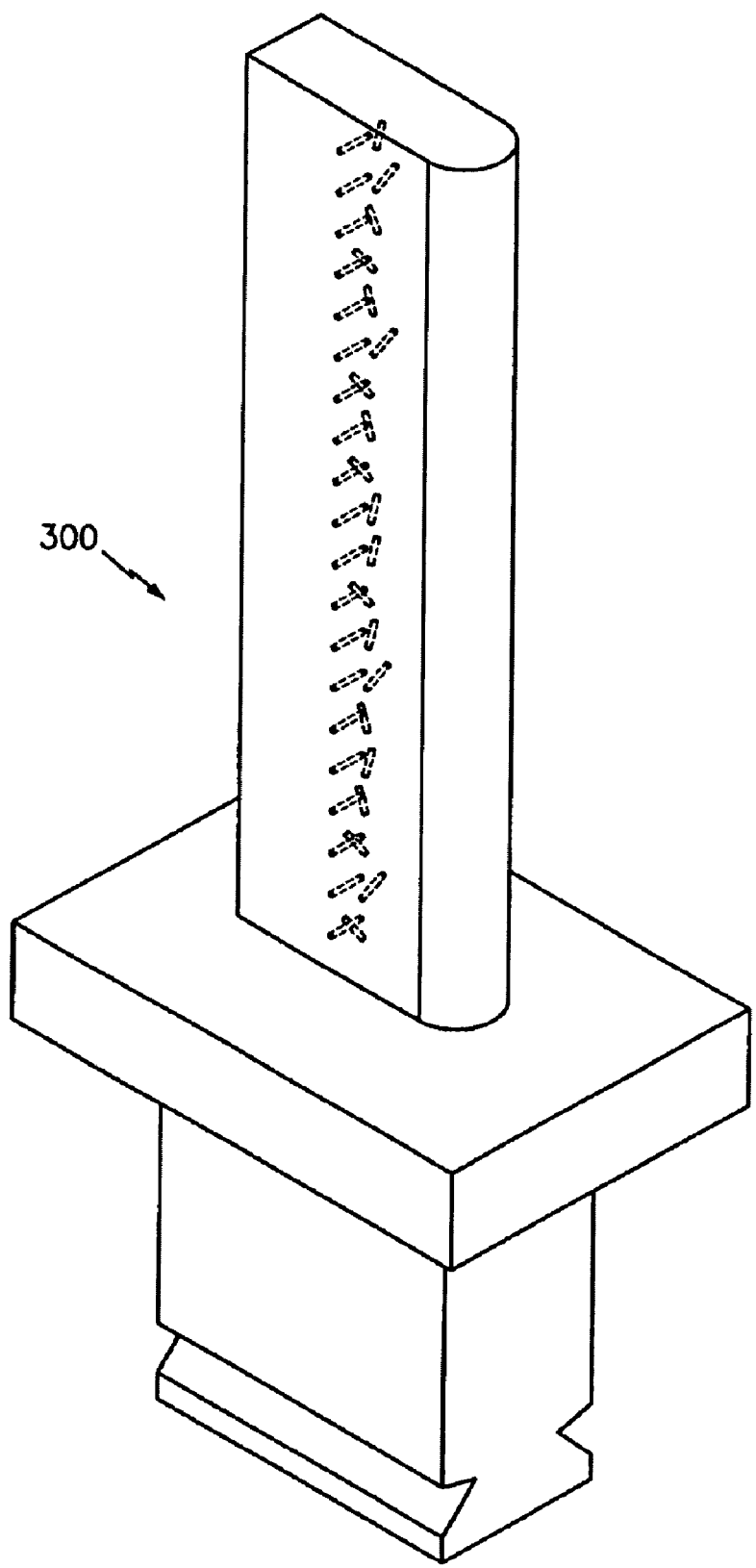
FIG. 5 is a representation of yet another alternative embodiment of the Check Standard of the present invention.

In yet another alternative embodiment, a Check Standard design 300 is depicted in FIG. 5 to demonstrate the variation of the placement and orientation of the cooling holes configuration. One of ordinary skill in the art will recognize and appreciate that there exist many alternate strategies for the placement and orientation of the cooling holes to fulfill the primary purpose of exercising each axis of the CMM, which requires the machine to actively measure the Check Standard along each axis of the CMM. Of secondary importance is the function of generating data this is diagnostic. That is, from the results of the measurements, it is desirable to determine the cause of deviations detected by the measurement in terms of the machine's geometrical configuration.

Check Standard 10 may be utilized to certify and/or calibrate a multi-axis coordinate measuring machine. Generally, the multi-axis coordinate measuring machine may have three or more axes. For purposes of illustration and not to be taken in a limiting sense, a method incorporating the use of Check Standard 10 will be described using a five-axis coordinate measuring machine.

A method for certifying and calibrating a multi-axis coordinate measuring machine may comprise loading Check Standard 10 into a means for holding of the multi-axis CMM. As is known to one of ordinary skill in the art, multi-axis CMMs are housed in enclosures, perform automated functions pursuant to operator driven commands and execute programs and algorithms as commanded and/or necessary. Generally, these measuring machines include an aperture to allow an operator to mount a part to be measured such as a Check Standard to a tool, fixture, platform and the like within the enclosed machine.

Once Check Standard 10 is mounted in place, the operator commands the CMM to engage a touch probe to measure the location of the six kinematic nest points on the surface of the Check Standard within the boundaries of the virtual coordinate system described earlier, that is, axes X, Y, Z, angle A and angle B, and planes X-Y, Y-Z and X-Z. In the present description, the phrase "touch probe" is a misnomer as the touch probe does not actually touch the surface of Check Standard 10. The touch probe in fact is placed proximate to each kinematic nest point and a low intensity laser beam is directed towards each point to measure their respective location within the virtual coordinate system. Based upon the measurements and locations of the kinematic nest points within the virtual coordinate system, the multi-axis CMM may then approximate the locations of the cooling holes configuration within the virtual coordinate system.

Once each kinematic nest point are measured using the touch probe, the operator may command the multi-axis CMM to disengage the touch probe and engage an optical probe to measure the actual location of all of the apertures in the cooling holes configuration. All of the apertures embody particular diameters, depths, angles and locations just as described for the primary apertures. Based upon the approximated or virtual measurements of the remaining apertures as described above, the optical probe may visually inspect and locate each aperture and determine its actual location based upon a coordinate system utilized by a program or algorithm designed for multi-axis CMMs as used by and known to one of ordinary skill in the art. By measuring and ascertaining the actual location of each aperture, the multi-axis CMM is also simultaneously verifying the accuracy of the virtual coordinate system of the Check Standard. The program or algorithm may calculate a measurement deviation of each cooling hole in the configuration by comparing the actual location measured by the optical probe to the virtual location as estimated by the touch probe.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A check standard for use in calibrating a multi-axis coordinate measuring machine, comprising:
   a body comprising a plurality of surfaces;
   one or more surfaces comprise a plurality of apertures configured to induce exercising a linear motion of an X axis and a Y axis during the calibration of said multi-axis coordinate measuring machine, requiring a dual axis motion during the calibration of said multi-axis coordinate measuring machine, testing a diameter measuring capability during the calibration of said multi-axis coordinate measuring machine, exercising the complete range of a tilt axis during the calibration of said multi-axis coordinate measuring machine, detecting a cyclic error of said tilt axis during the calibration of said multi-axis coordinate measuring machine, requiring simultaneous operation of said tilt axis and a rotary axis during the calibration of said multi-axis coordinate measuring machine, and diagnosing and detection of a non-orthogonality of a linear axis during the calibration of said multi-axis coordinate measuring machine;
   one or more surfaces comprise an origin of a coordinate system for said plurality of apertures; and
   one or more surfaces comprise a fixture capable of being received by said multi-axis coordinate measuring machine.

2. The check standard of claim 1, wherein said body comprises a substantially prismatic shape.

3. The check standard of claim 2, wherein said substantially prismatic shape includes a section substantially shaped like a root section of a turbine blade or turbine stator.

4. The check standard of claim 2, wherein said substantially prismatic shape includes a section substantially shaped like an airfoil section of a turbine blade or turbine stator.

5. The check standard of claim 1, wherein four surfaces of said one or more surfaces comprise a plurality of apertures.

6. The check standard of claim 1, wherein said plurality of apertures form a cooling holes configuration.

7. The check standard of claim 1, wherein a portion of said plurality of apertures are configured to induce exercising said linear motion of said X axis and said Y axis during the calibration of said multi-axis coordinate measuring machine.

8. The check standard of claim 1, wherein a portion of said plurality of apertures are configured to induce requiring said dual axis motion during the calibration of said multi-axis coordinate measuring machine.

9. The check standard of claim 1, wherein a portion of said plurality of apertures are configured to induce testing said diameter measuring capability during the calibration of said multi-axis coordinate measuring machine.

10. The check standard of claim 1, wherein a portion of said plurality of apertures are configured to induce exercising the complete range of said tilt axis during the calibration of said multi-axis coordinate measuring machine.

11. The check standard of claim 1, wherein a portion of said plurality of apertures are configured to induce detecting said cyclic error of said tilt axis during the calibration of said multi-axis coordinate measuring machine.

12. The check standard of claim 1, wherein a portion of said plurality of apertures are configured to induce requiring simultaneous operation of said tilt axis and said rotary axis during the calibration of said multi-axis coordinate measuring machine.

13. The check standard of claim 1, wherein a portion of said plurality of apertures is configured to induce diagnosing and detection of said non-orthogonality of said linear axis during the calibration of said multi-axis coordinate measuring machine.

14. The check standard of claim 1, wherein said origin comprises a tooling ball.

15. The check standard of claim 1, wherein said fixture comprises a section substantially shaped like a root section of a turbine blade or turbine stator.

16. A check standard for use in calibrating a multi-axis coordinate measuring machine, comprising:
a substantially prismatic shaped body comprising six surfaces;
one or more surfaces comprise a plurality of apertures configured to induce exercising a linear motion of an X axis and a Y axis during the calibration of said multi-axis coordinate measuring machine, requiring a dual axis motion during the calibration of said multi-axis coordinate measuring machine, testing a diameter measuring capability during the calibration of said multi-axis coordinate measuring machine, exercising the complete range of a tilt axis during the calibration of said multi-axis coordinate measuring machine, detecting a cyclic error of said tilt axis during the calibration of said multi-axis coordinate measuring machine, requiring simultaneous operation of said tilt axis and a rotary axis during the calibration of said multi-axis coordinate measuring machine, and diagnosing and detection of a non-orthogonality of a linear axis during the calibration of said multi-axis coordinate measuring machine;
one or more surfaces comprise an origin of a coordinate system for said plurality of apertures; and
one or more surfaces comprise a fixture capable of being received by said multi-axis coordinate measuring machine.

17. A check standard for use in calibrating a multi-axis coordinate measuring machine, comprising:
a prismatic shaped body comprising six surfaces and embodying one or more structural feature of a root section and one or more structural feature of an airfoil of a turbine blade or stator;
one or more surfaces comprise a plurality of apertures configured to induce exercising a linear motion of an X axis and a Y axis during the calibration of said multi-axis coordinate measuring machine, requiring a dual axis motion during the calibration of said multi-axis coordinate measuring machine, testing a diameter measuring capability during the calibration of said multi-axis coordinate measuring machine, exercising the complete range of a tilt axis during the calibration of said multi-axis coordinate measuring machine, detecting a cyclic error of said tilt axis during the calibration of said multi-axis coordinate measuring machine, requiring simultaneous operation of said tilt axis and a rotary axis during the calibration of said multi-axis coordinate measuring machine, and diagnosing and detection of a non-orthogonality of a linear axis during the calibration of said multi-axis coordinate measuring machine;
one or more surfaces comprise an origin of a coordinate system for said plurality of apertures; and
one or more surfaces comprise a fixture capable of being received by said multi-axis coordinate measuring machine.

18. A method for certifying and calibrating a multi-axis coordinate measuring machine, comprising:
loading a check standard into a means for holding of said multi-axis coordinate measuring machine;
measuring a virtual location of each of a plurality of apertures of said check standard within a virtual coordinate system using a touch probe of said multi-axis coordinate measuring machine;
measuring an actual location of each of said plurality of apertures and simultaneously verifying the accuracy of said virtual coordinate system of said check standard using an optical probe of said multi-axis coordinate measuring machine; and
calculating a deviation between said actual location of each of said plurality of apertures and a virtual location of each of said plurality of apertures of said virtual coordinate system.

19. The method of claim 18, wherein measuring said virtual coordinate system comprises:
placing said touch probe proximate to a first point of a six-point kinematic nest of said check standard in an X-Y plane of said virtual coordinate system;
placing said touch probe proximate to a second point of said six-point kinematic nest in said X-Y plane of said virtual coordinate system;
placing said touch probe proximate to a third point of said six-point kinematic nest in said X-Y plane of said virtual coordinate system;
placing said touch probe proximate to a fourth point of said six-point kinematic nest in said X-Y plane of said virtual coordinate system;
placing said touch probe proximate to a fifth point of said six-point kinematic nest in a Y direction of said virtual coordinate system; and
placing said touch probe proximate to a sixth point of said six-point kinematic nest in said Y direction of said virtual coordinate system.

20. The method of claim 18, wherein measuring said actual location of each of said plurality of apertures and simultaneously verifying said virtual coordinate system comprises:
placing said optical probe proximate to each of said plurality of apertures;
visually determining said actual location of each of said plurality of apertures;
comparing said actual location of each of said plurality of apertures with said virtual coordinate system; and
verifying the accuracy of said virtual coordinate system.

21. The method of claim 18, wherein calculating said deviation comprises executing an algorithm to determine said deviation.

22. The method of claim 18, wherein said check standard comprises:
- a body comprising a plurality of surfaces;
- one or more surfaces comprise a plurality of apertures configured to induce exercising a linear motion of an X axis and a Y axis during the calibration of said multi-axis coordinate measuring machine, requiring a dual axis motion during the calibration of said multi-axis coordinate measuring machine, testing a diameter measuring capability during the calibration of said multi-axis coordinate measuring machine, exercising the complete range of a tilt axis during the calibration of said multi-axis coordinate measuring machine, detecting a cyclic error of said tilt axis during the calibration of said multi-axis coordinate measuring machine, requiring simultaneous operation of said tilt axis and a rotary axis during the calibration of said multi-axis coordinate measuring machine, and diagnosing and detection of a non-orthogonality of a linear axis during the calibration of said multi-axis coordinate measuring machine;
- one or more surfaces comprise an origin of a coordinate system for said plurality of apertures; and
- one or more surfaces comprise a fixture capable of being received by said multi-axis coordinate measuring machine.

\* \* \* \* \*